United States Patent [19]

Tabachnick

[11] 4,452,354
[45] Jun. 5, 1984

[54] EYEGLASS HOLDER

[76] Inventor: Wayne Tabachnick, One Giffard Way, Melville, N.Y. 11747

[21] Appl. No.: 457,557

[22] Filed: Jan. 13, 1983

[51] Int. Cl.³ .................. A45C 11/04; E04G 3/00
[52] U.S. Cl. .................................. 206/5; 224/253; 248/205.3
[58] Field of Search .............. 206/5; 224/253, 250; 248/205.3

[56] References Cited

U.S. PATENT DOCUMENTS

| 2,850,152 | 9/1958 | Murrufo | 224/253 |
| 3,119,429 | 1/1964 | Stiller et al. | 150/40 |
| 3,148,812 | 9/1964 | Hilsinger, Jr. | 224/250 |
| 3,259,348 | 7/1966 | Dann | 248/205.3 |
| 4,239,167 | 12/1980 | Lane | 248/205.3 |

FOREIGN PATENT DOCUMENTS 2728906  1/1979  Fed. Rep. of Germany .......... 206/5

Primary Examiner—William T. Dixson, Jr.
Attorney, Agent, or Firm—Seidel, Gonda & Goldhammer

[57] ABSTRACT

A device for supporting a pair of eyeglasses is provided in the form of a tube of flexible plastic. The tube has oppositely disposed wide sidewalls and substantially narrower end walls so that the inner periphery of the tube is elongated and generally rectangular. An adhesive pad is attached to one of the wide walls for adhesively securing the tube to a support surface. The device supports eyeglasses by having one of the eyeglass struts extending through the generally rectangular opening.

8 Claims, 4 Drawing Figures

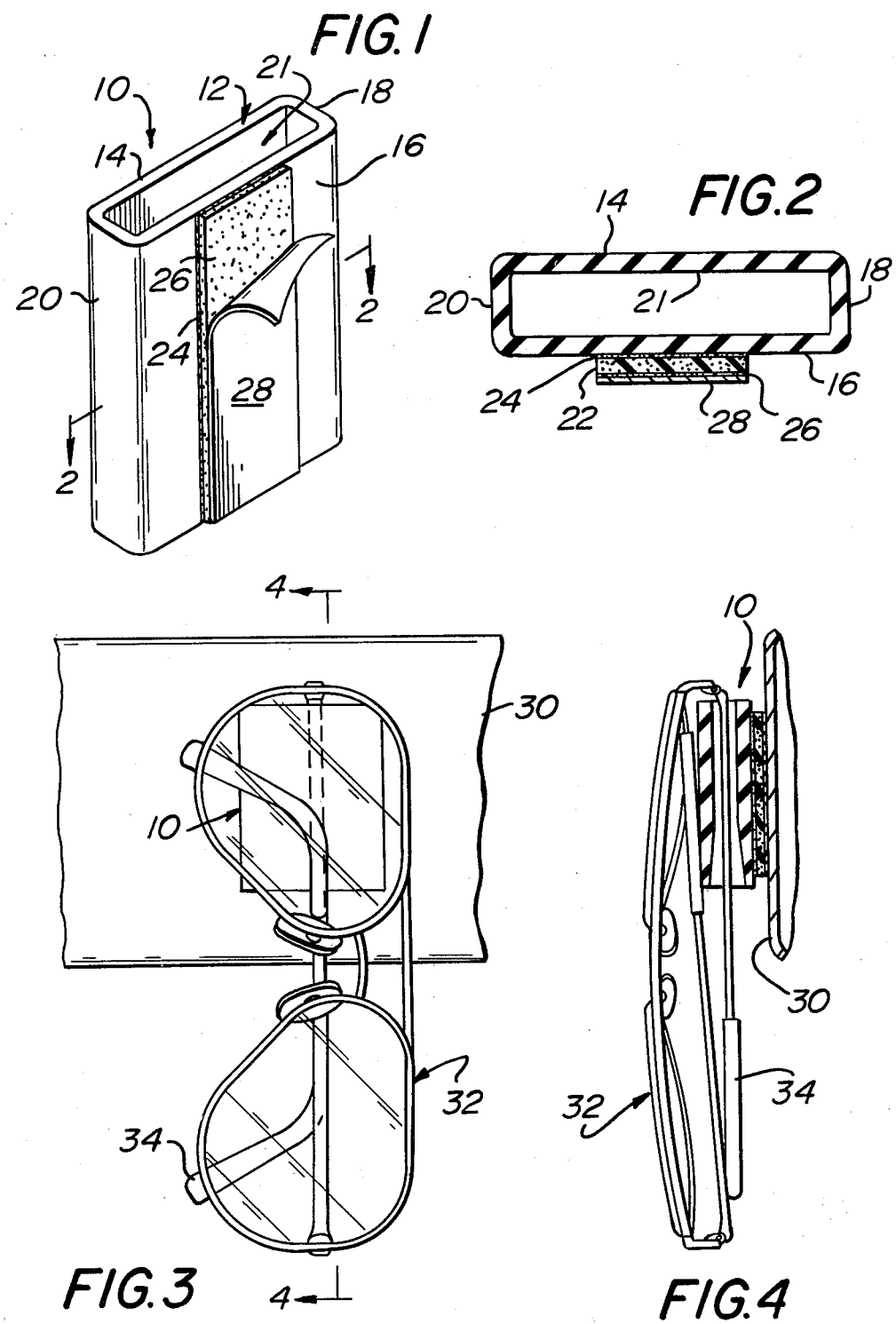

EYEGLASS HOLDER

BACKGROUND OF THE INVENTION

There is a need for a simple and inexpensive holder for supporting eyeglasses and other devices on upright surfaces such as the dashboard of an automobile, a bed post, etc. The present invention is directed to a solution of that problem.

SUMMARY OF THE INVENTION

The present invention is directed to a holder for supporting eyeglasses and other devices. The holder includes a tube of flexible plastic having oppositely disposed wide side walls and substantially narrower end walls so that the inner periphery of the tube is elongated and generally rectangular. A means is attached to one of the wide walls for adhesively securing the tube to a support surface.

It is an object of the present invention to provide a novel holder for supporting eyeglasses and the like while being constructed in a manner so that it may be rapidly produced in an inexpensive manner.

Other objects and advantages will appear hereinafter.

For the purpose of illustrating the invention, there is shown in the drawings a form which is presently preferred; it being understood, however, that this invention is not limited to the precise arrangements and instrumentalities shown.

FIG. 1 is a perspective view of a holder in accordance with the present invention.

FIG. 2 is a sectional view taken along the line 2—2 in FIG. 1.

FIG. 3 is an elevation view showing the holder of the present invention supporting a pair of eyeglasses on the dashboard of a vehicle.

FIG. 4 is a sectional view taken along the line 4—4 in FIG. 3.

DETAILED DESCRIPTION

Referring to the drawing in detail, wherein like numerals indicate like elements, there is shown in FIG. 1 a holder in accordance with the present invention designated generally as 10. The holder 10 is in the form of a tube 12 of flexible polymeric plastic material preferably having a high gloss finish. The tube 12 has wide side walls 14 and 16 which are oppositely disposed and connected together by substantially narrower end walls 18 and 20. The inner periphery 21 of the tube 12 is an elongated generally rectangular surface.

By way of illustration, tube 12 preferably has a length of approximately 2 inches, the walls 14 and 16 have a width of about 1½ inches, and the end walls 18, 20 have a width of about 3/8ths of an inch. The distance between walls 14 and 16 is about 3/16ths of an inch.

On one of the wide side walls, such as wall 16, there is provided means for adhesively attaching the tube 12 to a generally vertical surface. The vertical surface need not be planar and may assume a wide variety of shapes such as the dashboard of a vehicle, a bed post, a wall, etc. The adhesive mounting means includes a pad 22 adhesively bonded to the wall 16 by a layer of adhesive 24. On the side of the pad 22 opposite layer 24, there is provided a layer of adhesive 26 protected by a non-adhering layer 28.

The tube 12 may be extruded at high speed. Thereafter, the adhesive mounting means may be applied to wall 16. Thereafter, the thusly formed tube is cut into the short lengths as illustrated in FIG. 1 and described above. The thusly described construction facilitates producing holder 10 at high speed without the need for any specialized machinery and facilitates producing the holder 10 inexpensively.

In order to use the holder 10, the protective layer 28 is stripped and discarded. The exposed adhesive layer 26, which is pressure sensitive, is positioned opposite the mounting surface such as dashboard 30 of a vehicle. Pressure is applied to cause the adhesive layer 26 to adhere to the dashboard 30 by applying pressure through the wall 14. When pressure is applied to wall 14, it deforms inwardly and contacts the wall 16. In this manner, pressure is applied to the pad 22 for causing the adhesive layer 26 to attach to the dashboard 30 or other support. Thereafter, strut 34 of eyeglasses 32 is inserted through the tube 12 as shown in FIGS. 3 and 4. The flexibility of the wall 16 facilitates application of holder 10 to round surfaces such as a bed post.

While holder 10 is illustrated and described in connection with eyeglasses, it may be used to suport a variety of devices such as scissors, pliers, etc. Thus, the head and bristles on a toothbrush will not pass through the tube but the handle can extend through the tube. To facilitate the ease with which devices extend through tube 12, the side wall thickness at the lower end decreases to about ½ the wall thickness of the upper end as shown in FIG. 4.

The present invention may be embodied in other specific forms without departing from the spirit or essential attributes thereof and, accordingly, reference should be made to the appended claims, rather than to the foregoing specification, as indicating the scope of the invention.

I claim:

1. A holder for supporting a device comprising a tube of flexible plastic having oppositely disposed wide side walls and substantially narrower end walls so that the inner periphery of the tube is elongated and generally rectangular, said side walls being sufficiently flexible so that one side wall may be deformed into contact with the other side wall by application of finger pressure and is sufficiently resilient so as to cause the side walls to return to their original shape wherein they are generally parallel to one another, and means attached to the other wide side wall for adhesively securing the tube to a support surface.

2. A holder in accordance with claim 1 wherein said means includes a layer of pressure sensitive adhesive covered by a removeable protective layer.

3. A holder in accordance with claim 1 wherein said tube has a length of about 2 inches and a width across the wide side walls of about 1½ inches, the width across the narrower end walls being approximately ⅜ of an inch.

4. A holder in accordance with claim 1 wherein said means includes a layer of adhesive extending along the entire length of one of the wide side walls.

5. A holder in accordance with claim 4 wherein the width of said layer of adhesive is substantially less than the width of the side walls.

6. A holder comprising a tube of flexible plastic having oppositely disposed wide side walls and substantially narrower end walls so that the inner periphery of the tube is elongated and generally rectangular, means attached to one of the wide side walls for adhesively securing the tube to a support surface including a layer of pressure sensitive adhesive covered by a removeable protective layer, the width of said layer of adhesive being substantially less than the the width of the side walls and said side walls being sufficiently flexible so that one side wall may be deformed into contact with the other side wall by application of finger pressure and is sufficiently resilient so as to cause the side walls to return to their original shape wherein they are generally parallel to one another.

7. A holder in accordance with claim 6 wherein said tube has a length greater than the width of said side walls.

8. A holder in accordance with claim 6 wherein the side walls are thinner at one end which is adapted to be the lower end when in use.

* * * * *